United States Patent
Hoye et al.

(10) Patent No.: US 10,847,187 B1
(45) Date of Patent: Nov. 24, 2020

(54) DYNAMIC PAIRING OF DEVICE DATA BASED ON PROXIMITY FOR EVENT DATA RETRIEVAL

(71) Applicant: Lytx, Inc., San Diego, CA (US)

(72) Inventors: Brett Hoye, San Marcos, CA (US); Anton Lunde, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 15/988,672

(22) Filed: May 24, 2018

(51) Int. Cl.
| | |
|---|---|
| G11B 27/19 | (2006.01) |
| G11B 27/34 | (2006.01) |
| H04N 5/77 | (2006.01) |
| H04N 7/18 | (2006.01) |
| G06F 16/78 | (2019.01) |

(52) U.S. Cl.
CPC .......... G11B 27/19 (2013.01); G06F 16/7867 (2019.01); G11B 27/34 (2013.01); H04N 5/77 (2013.01); H04N 7/181 (2013.01)

(58) Field of Classification Search
CPC .......... G11B 27/19; G11B 27/34; H04N 5/77; H04N 7/181; G06F 16/7867
USPC ........ 386/224, 240, 248; 348/148, 159, 143; 382/104
See application file for complete search history.

(56) References Cited

U.S. PATENT DOCUMENTS

| | | | | |
|---|---|---|---|---|
| 2013/0330055 | A1* | 12/2013 | Zimmermann | G06F 16/78 386/240 |
| 2014/0169752 | A1* | 6/2014 | May | G06F 16/7867 386/224 |
| 2016/0050356 | A1* | 2/2016 | Nalepka | H04N 5/23203 348/148 |
| 2017/0277700 | A1* | 9/2017 | Davis | G06K 9/00664 |
| 2017/0294213 | A1* | 10/2017 | Brauckmann | G06K 9/00228 |
| 2018/0072270 | A1* | 3/2018 | Renaud | B60R 25/305 |
| 2018/0218582 | A1* | 8/2018 | Hodge | G06Q 40/08 |
| 2018/0367731 | A1* | 12/2018 | Gatti | H04N 5/23238 |
| 2019/0120650 | A1* | 4/2019 | Miyake | G06K 9/00785 |
| 2019/0147259 | A1* | 5/2019 | Molin | G06F 16/743 382/104 |
| 2019/0246078 | A1* | 8/2019 | Araya | G11B 19/02 |

* cited by examiner

Primary Examiner — Thai Q Tran
Assistant Examiner — Stephen R Smith
(74) Attorney, Agent, or Firm — Van Pelt, Yi & James LLP

(57) ABSTRACT

A system for dynamic pairing includes an interface and a processor. The interface is configured to receive an indication to identify paired event data based on an event time and an event location. The processor is configured to determine a paired video data region; retrieve a subset of video data stored in a pairing database or from a vehicle event recorder; and provide the subset of the video data as the paired event data. The paired video data region includes locations spatially nearby the event location and times temporally nearby the event time. The pairing database or the vehicle event recorder stores a video data. The video data is retrievable based on an associated time data and/or location data. The video data is placed in the subset of video data in response to the associated time data and location data being within the paired video data region.

12 Claims, 9 Drawing Sheets

US 10,847,187 B1

DYNAMIC PAIRING OF DEVICE DATA BASED ON PROXIMITY FOR EVENT DATA RETRIEVAL

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. When an anomalous event is determined by a vehicle event recorder mounted on a vehicle it is advantageous to gather all available data related to the anomalous event in order to be able to make determinations about the event with as much accuracy as possible. In some situations one or more nearby vehicles are able to capture video data related to the event (e.g., in the event a nearby vehicle includes a camera that captures video data related to the event). This video data can be important to making the most accurate determination of event information. However, the nearby vehicle is not necessarily associated with the vehicle comprising the vehicle event recorder that determined the event, creating a problem wherein associating all of the relevant data is very difficult.

BRIEF DESCRIPTION OF THE DRAWINGS

Various embodiments of the invention are disclosed in the following detailed description and the accompanying drawings.

DETAILED DESCRIPTION

Figure 1:
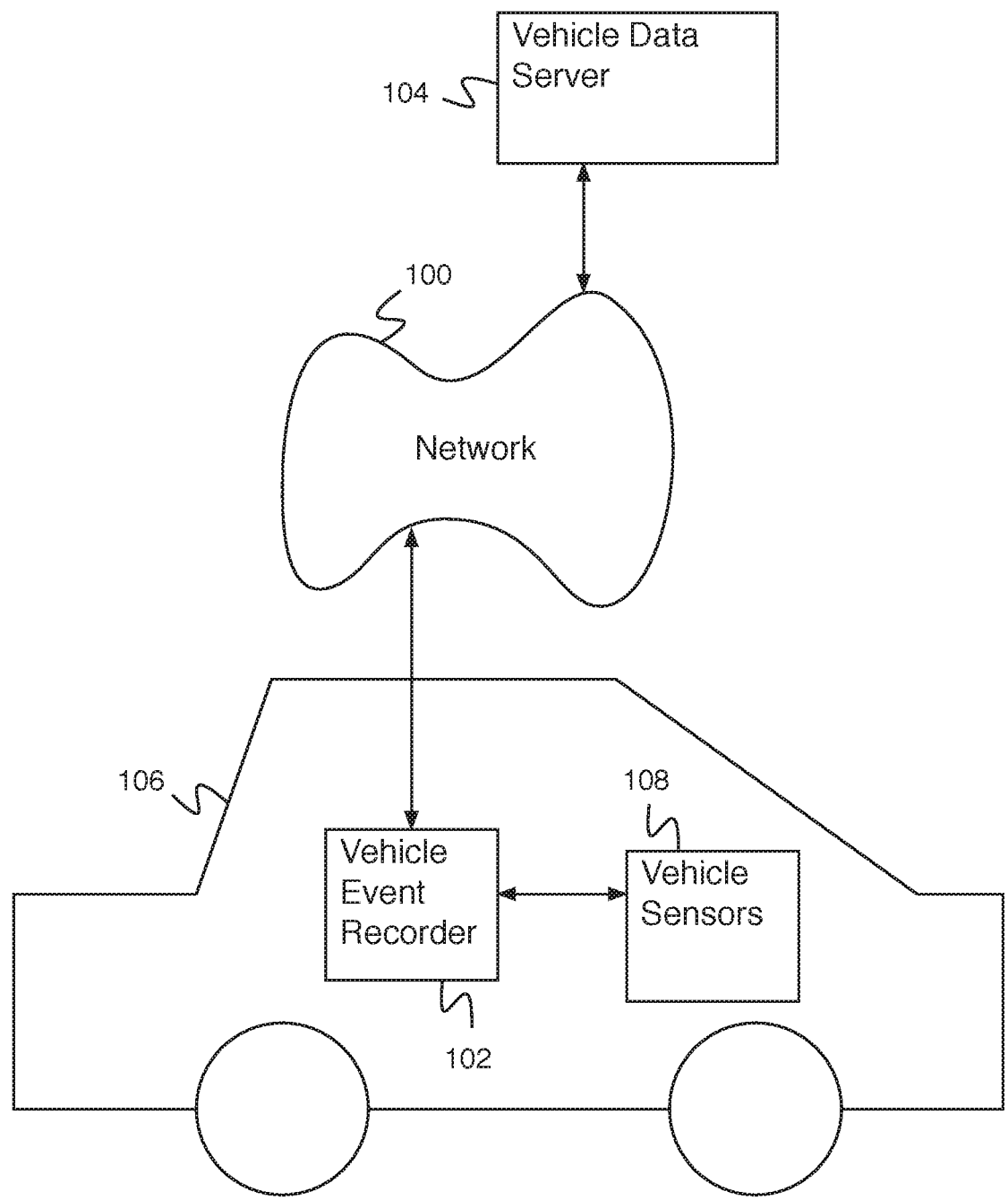
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for dynamic pairing comprises an interface configured to receive an indication to identify paired event data based at least in part on an event time and an event location, wherein the event data is associated with a vehicle. The system for dynamic pairing additionally comprises a processor configured to determine a paired video data region, wherein the paired video data region includes locations spatially nearby the event location and includes times temporally near the event time, and retrieve a subset of video data stored in a pairing database, wherein the pairing database receives a video data, wherein the video data is retrievable based on an associated time data and an associated location data, and wherein the video data is placed in the subset of video data in response to the associated time data and the associated location data being within the paired video data region. The processor is additionally configured to provide the subset of the video data as the paired event data. The system additionally comprises a memory coupled to the processor and configured to provide the processor with instructions.

A system for dynamic pairing comprises a pairing database for storing and retrieving data. The pairing database comprises part of a vehicle data server in communication with a plurality of vehicle event recorders mounted on vehicles. The vehicle event recorders record sensor data (e.g., audio data, video data, accelerometer data, GPS data, etc.). In the event a vehicle event recorder detects an anomalous event, sensor data related to the anomalous event is uploaded to the vehicle data server for analysis. At other times, all data is uploaded from the vehicle event recorder to the vehicle data server. For instance, when a vehicle reaches a vehicle depot, its data is uploaded for long-term storage to the vehicle data server. Video received from a plurality of vehicle event recorders is stored in the pairing database of the vehicle data server. Each frame of video stored in the pairing database is associated with a time and location (e.g., the time and location describing where and when they were recorded). Video data in the pairing data is retrievable based on the associated time and location. When the system for dynamic pairing receives an indication to identify paired event data based at least in part on an event time and an event location, the system first determines a paired video data region associated with the event time and the event location. The paired video data region includes locations spatially nearby the event location (e.g., within a given radius, within a defined geofenced area, etc.) and times temporally nearby the event time (e.g., within a time window of the event time). A subset of stored video data is retrieved from the pairing database or vehicle event recorder(s), wherein video data is placed in the subset of video data in response to the associated time data and the associated location data being within the paired video data region. The subset is then provided as the paired event data in response to the request. In the event multiple subsets of video data are stored in the pairing database, they are each retrieved and provided.

The system for dynamic pairing comprises a system for determining one or more video data subsets from a video database, wherein the one or more video data subsets were each recorded at approximately the same location and at approximately the same time. The one or more video data subsets can then be used to potentially gain multiple views of an anomalous event or incident. For example, a truck is backing up to a loading dock and hits a pallet of cargo that was mistakenly left in its way. The back-up camera on the truck is first checked to determine the root cause of the incident but the back-up camera did not capture when or why the pallet was left. Using the system for dynamic pairing, data from other cameras in the area that were recording during or leading up to the incident can be retrieved. For example, data from other trucks that were nearby at the loading dock, data from cars driving by, data from fixed cameras mounted on the loading dock, etc. This data can be synchronized and viewed to see a much larger picture of the events leading up to the incident and find the worker who abandoned the pallet in a disallowed location.

The system for dynamic pairing thus improves the computer by allowing the automatic association of spatially and temporally related video data, from which new insights can be gained. In a traditional system, video data recorded by a vehicle event recorder is associated with the vehicle on which the vehicle event recorder is mounted and the fleet which the vehicle is part of. However, determining which of the fleet video data or other related video data that shows the same location or the same time was not directly possible. The computer system is improved enabling a user to find and/or view video related to an event by location and/or time. The computer system is made more useful and efficient for the user in being able to appropriately view data associated with an event.

FIG. 1 is a block diagram illustrating an embodiment of a system including a vehicle event recorder. In the example shown, a user or system application indicates to the system that an event is of interest. Video data stored in a pairing database is searched for video data associated with a location region and a temporal region. The identified video data is placed in a subset of video data for review or further processing.

Vehicle event recorder 102 comprises a vehicle event recorder mounted in a vehicle (e.g., a car, a truck, a trailer associated with a semi truck, a van, a bus, a commercial vehicle, etc.). Vehicle event recorder 102 is in communication with sensors 108. Sensors 108 comprises a sets of sensors, for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors, for example a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location, for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

Vehicle data server 104 comprises a vehicle data server for communicating with vehicle event recorder 102 via network 100. Vehicle data server 104 receives data, processes data, stores data, requests more data, provides stored data, etc. Vehicle data server 104 comprises a system for dynamic pairing. Video data received by vehicle data server 104 is stored by a pairing database. Data stored in the pairing database is retrievable based on an associated time data and an associated location data. For example, each video frame of data stored in the pairing database is associated with a time and a location. In the event an event is determined by vehicle event recorder and more data related to the event is desired, data is requested from the pairing database based on the time and location associated with the event. Vehicle data server 104 first determines a paired video data region. The paired video data region comprises a region in time and space (e.g., a paired video time region and a paired video space region) within which the pairing database attempts to match video data. The paired video data region includes locations spatially nearby the event location and includes times temporally near the event time. A subset of video stored in the pairing database is then retrieved by vehicle data server 104, wherein video data is placed in the subset of video data in response to the associated time data and the associated location data being within the paired video data region. In some embodiments, multiple subsets are determined, wherein each subset is associated with a single camera. The subset is then provided. In some embodiments, the extent of the paired video data region is selectable—for example, the spatial radius that is nearby is selectable (e.g., the spatial region is selectable as a polygonal region, an oval region, a square region, a rectangular, etc.) or the temporal region is selectable (e.g., the temporal region is selectable as symmetric about a time, as assymetric about a time, with a selectable start time, with a selectable stop time, etc.).

Figure 2:
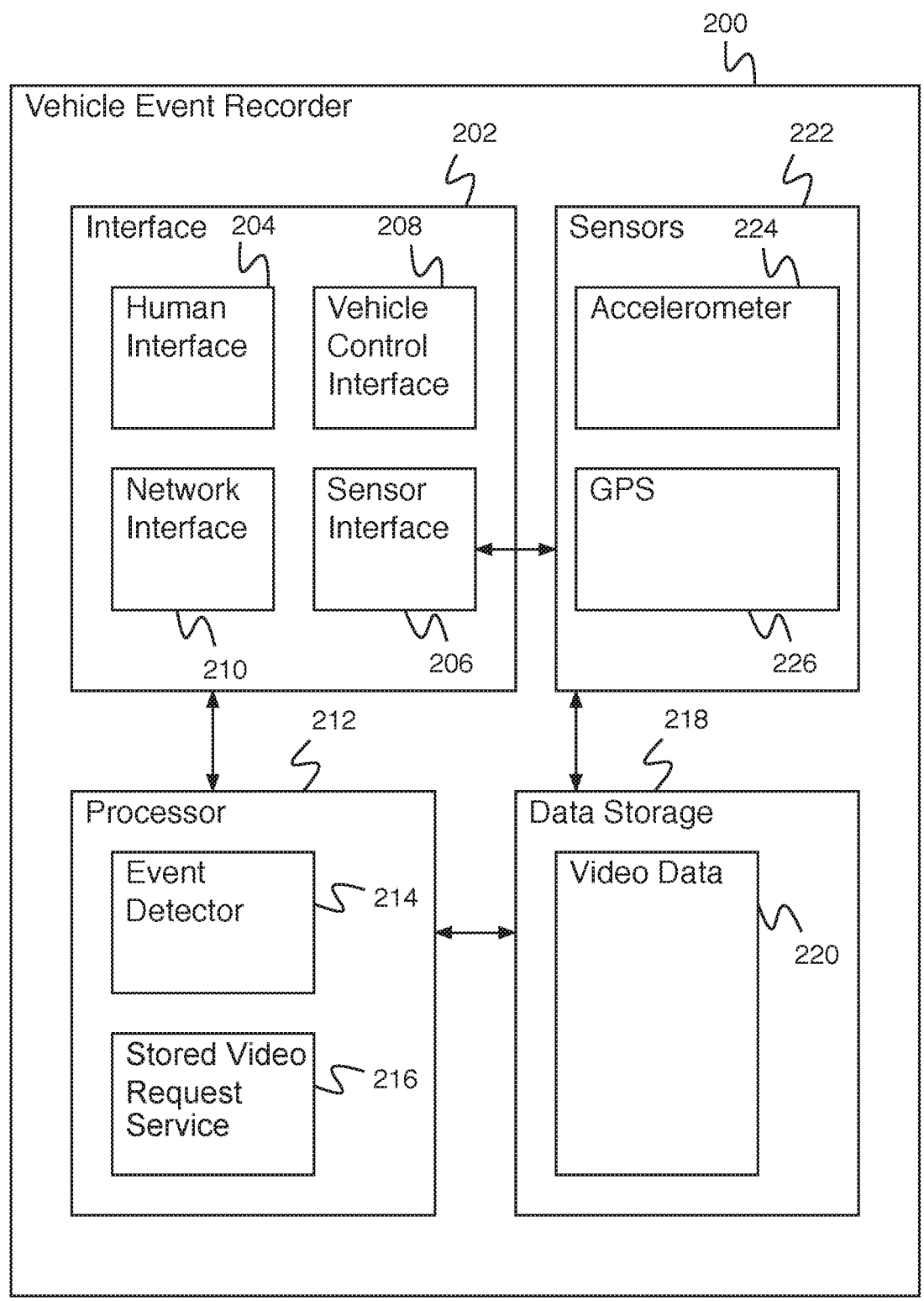
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 process sensor data using processor 212. Processor 212 receives sensor data via sensor interface 206 of interface 202 and from internal sensors (e.g., GPS 226 or accelerometer 224 of sensors 222). Processor 212 determines a likely event using event detector 214 and then requests paired event data using paired event data requestor 216. The request for paired event data comprises a time and a location. In some embodiments, paired event data comprises video data created by a video camera. In some embodiments, a user using a computer system accessing a video server requests paired event data. In some embodiments, vehicle event recorder 200 does not include paried event data requestor 216.

Vehicle event recorder 200 comprises interface 202. Interface 202 comprises a set of interfaces to other systems. Human interface 204 comprises an interface to a human interaction system—for example, an audio output, a display output, etc. Sensor interface 206 comprises an interface to one or more sensors for receiving sensor data. Sensor interface 206 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 206 comprises a vehicle bus (e.g., society of automotive engineers (SAE) J1939, J1708/J1587, OBD-II, CAN BUS, etc.). In some embodiments, vehicle event recorder 200 communicates with vehicle state sensors via the vehicle bus.

Vehicle control interface 208 comprises an interface to one or more vehicle control systems (e.g., for adjusting vehicle control parameters, for putting the vehicle in a safe mode, for adjusting an automatic driving control parameter, etc.). Network interface 210 comprises a network interface for communicating with other systems via a network (e.g., network 100 of FIG. 1). Network interface 210 comprises one or more of a GSM interface, a CDMA interface, an LTE interface, a WiFi™ interface, an Ethernet interface, a Universal Serial Bus (USB) interface, a Bluetooth™ interface, an Internet interface, etc. Processor 212 comprises a processor for controlling the operations of vehicle event recorder 200, for reading and writing information on data storage 218, for reading and/or writing data via interface 202, etc. Processor 212 comprises event detector 214 for determining events from data (e.g., video data, sensor data, etc.). Processor 212 additionally comprise a stored video request service 216 to support accessing paired event data determined by the Vehicle Data Server (e.g., vehicle data server 300 of FIG. 3). For example, paired event data comprises video data associated with an event determined by event detector 214 or some other event classifier. A paired event data request by the Vehicle Data Server comprises a time period and/or a location region and is sent to the Vehicle Event Recorder (e.g. via interface 202). The paired event data is retrieved from the Vehicle Event Recorder and then stored in data storage 218. Vehicle Event Recorder processor 212 retrieves the requested paried video segment from data storage 218 or directly from the Vehicle Event Recorder for processing or associating with a subset of paired data for subsequent storage.

Data storage 218 comprises a data storage (e.g., a random access memory (RAM), a read only memory (ROM), a nonvolatile memory, a flash memory, a hard disk, or any other appropriate data storage). Data storage 218 comprises a data storage for storing instructions for processor 212, vehicle event recorder data, vehicle event data, sensor data, video data, vehicle information, vehicle identifying information, anomalous event information, etc. Data storage 218 comprises continuous video data 220 comprising stored continuous video data from one or more cameras mounted on the vehicle for a previous time period (e.g., 1 minute, 5 minutes, 1 hour, 1 day, etc.).

Figure 3:
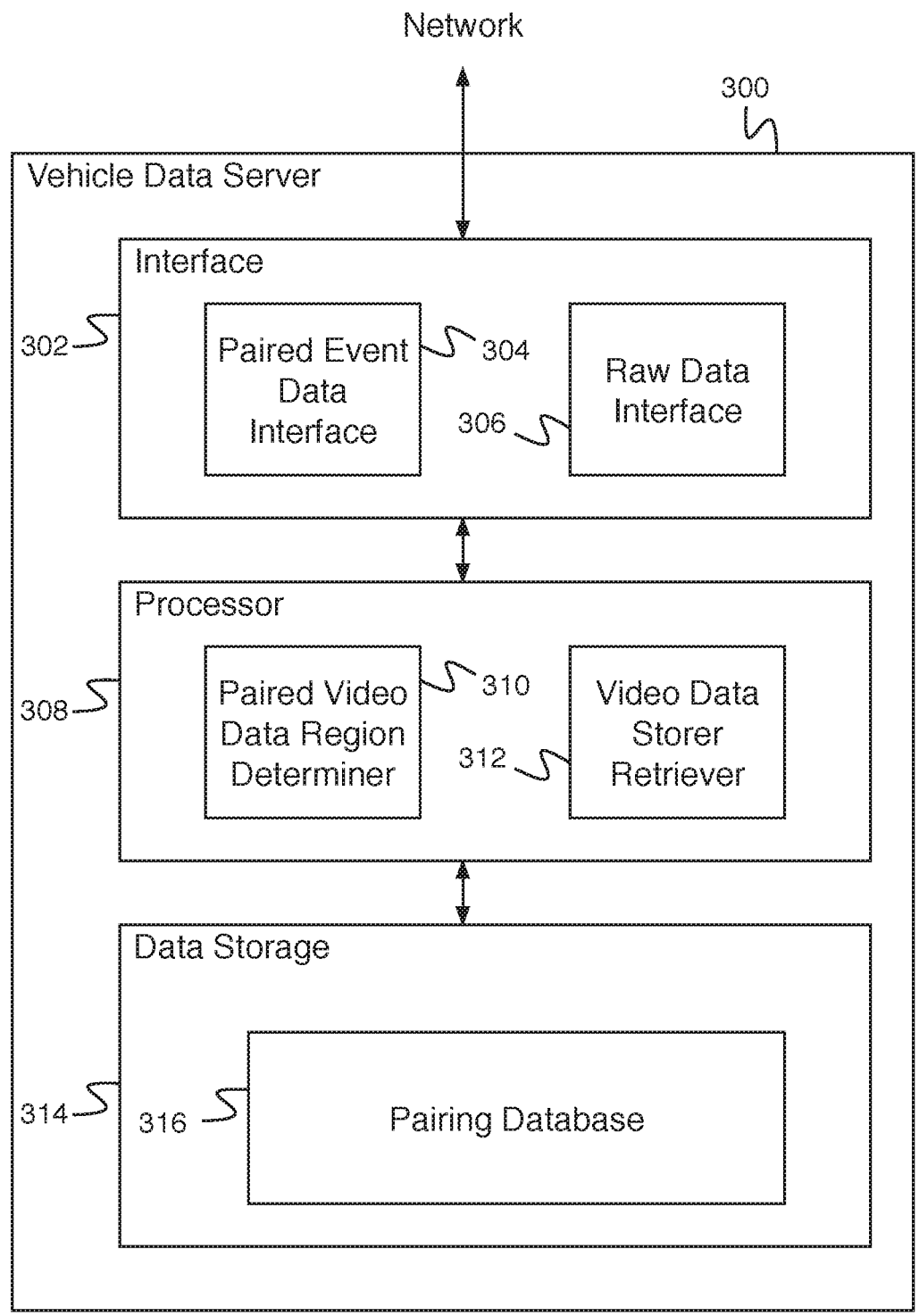
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 receives an indication to identify paired event data based at least in part on an event time and an event location. The event data is associated with a vehicle (e.g., a vehicle including a vehicle event recorder). The request is received by interface 302 (e.g., by paired event data interface 304) and processed by processor 308. Processor 308 determines a paired video data region using paired video data region determiner 310. A paired video data region comprises a region in time and space (e.g., a paired video time region and a paired video space region). Video data storer retriever 312 then retrieves a subset of video(s) stored (e.g., video frame data) on the Vehicle Event Recorders and/or in pairing database 316 of data storage 314, wherein the time data associated with the subset of video is within the paired video time region and the location data associated with the subset of video is within the paired video location region. Vehicle data server 300 additionally receives raw video data (e.g., using raw data interface 306 of interface 302) and stores the raw data in pairing database 316 (e.g., using video data storer retriever 312), where the raw video data is received from one or more sources (e.g., vehicle event recorder(s), building video camera(s), mounted video camera(s), phone camera(s), etc.).

Figure 4:
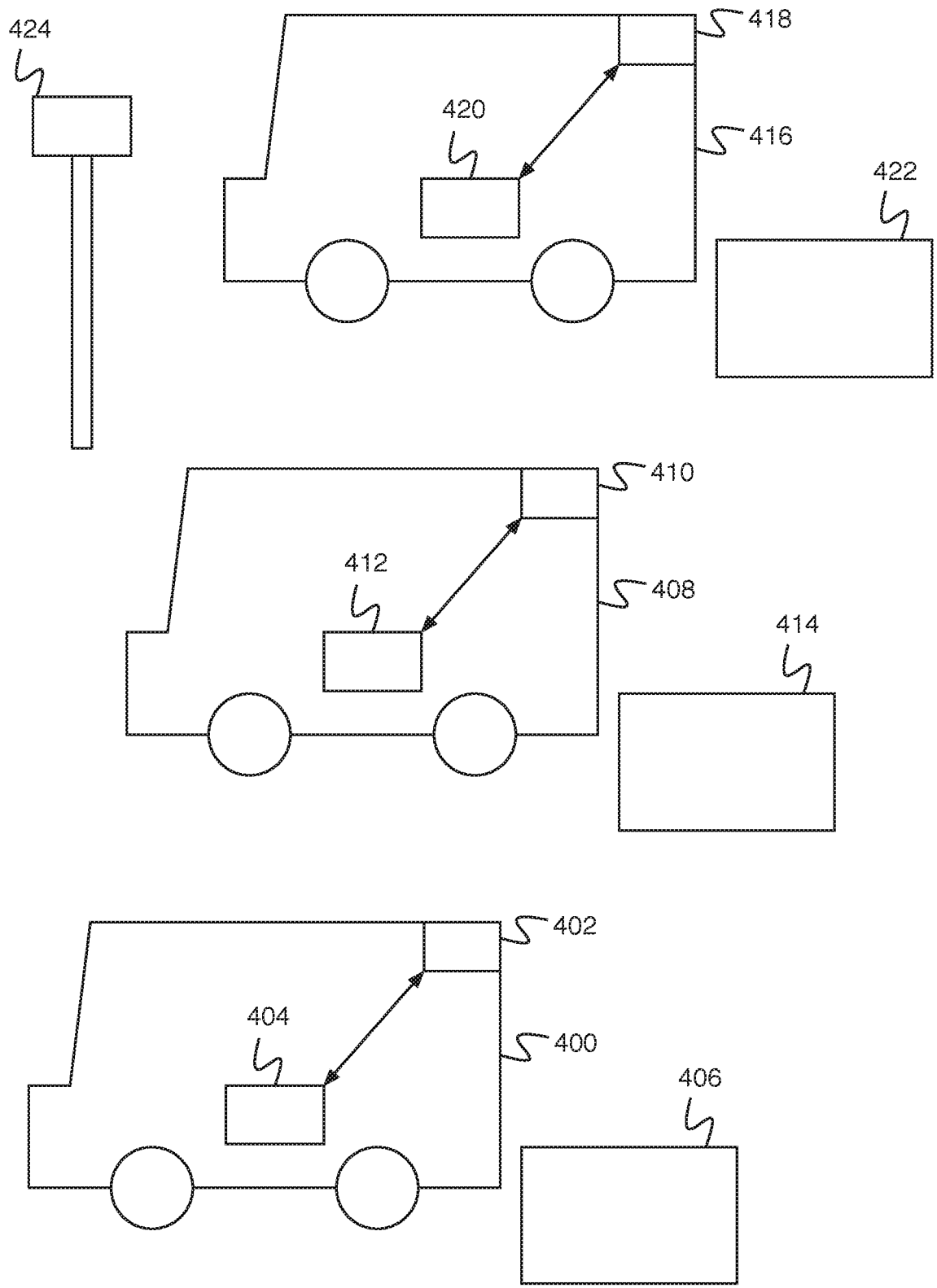
FIG. 4 is a diagram illustrating an embodiment of a vehicle depot.

FIG. 4 is a diagram illustrating an embodiment of a vehicle depot. In the example shown, at the vehicle depot of FIG. 4, vehicle 400 includes mobile camera 402. Vehicle 400 is unloading at loading dock 406. Mobile camera 402 is coupled to vehicle event recorder 404. Vehicle event recorder 404 stores video data from mobile camera 402, detects events, etc. Vehicle event recorder 404 is in communication with a vehicle data server via a network. Vehicle 408 includes mobile camera 410. Vehicle 408 is unloading at loading dock 414. Mobile camera 410 is coupled to vehicle event recorder 412. Vehicle event recorder 412 stores video data from mobile camera 410, detects events, etc. Vehicle event recorder 412 is in communication with a vehicle data server via a network. Vehicle 416 includes mobile camera 418. Vehicle 416 is unloading at loading dock 422. Mobile camera 418 is coupled to vehicle event recorder 420. Vehicle event recorder 420 stores video data from mobile camera 418, detects events, etc. Vehicle event recorder 420 is in communication with a vehicle data server via a network. Fixed camera 424 observes activities at the vehicle depot. When an anomalous event occurs at the vehicle depot and is detected by one of vehicle event recorder 404, vehicle event recorder 412, or vehicle event recorder 420, video from all present cameras (e.g., mobile camera 402, mobile camera 410, mobile camera 418, and fixed camera 424) can be used to determine a most complete picture of the event. A system for dynamic pairing can be utilized to associate the video data from the cameras.

Figure 5:
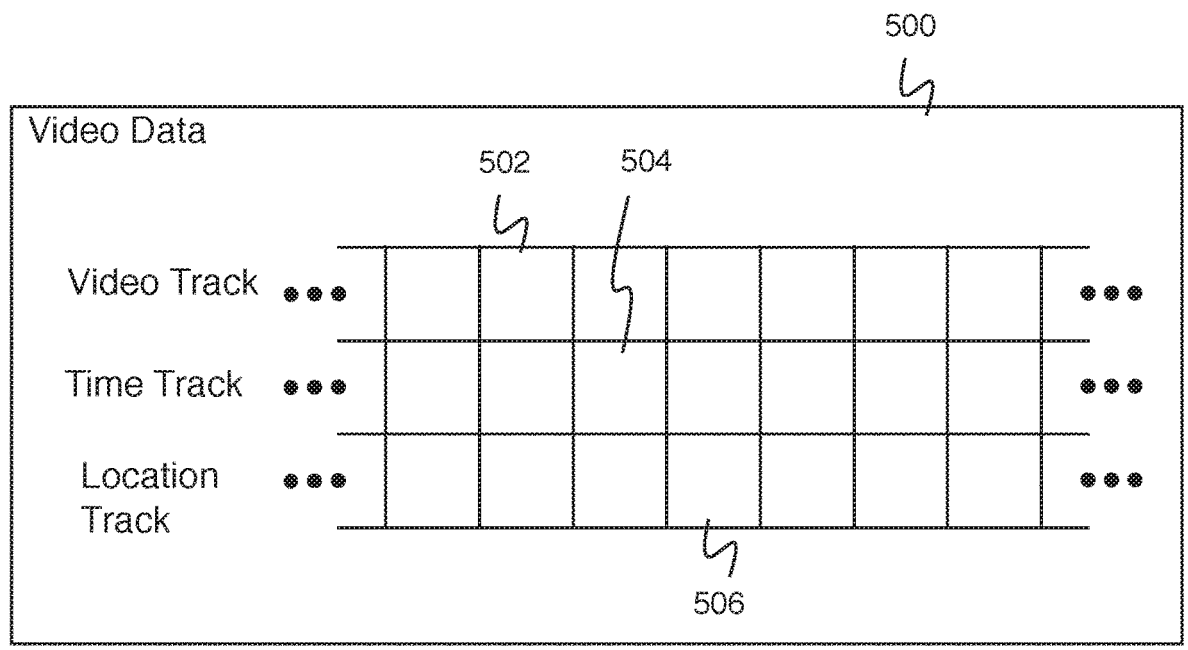
FIG. 5 is a diagram illustrating an embodiment of a video data structure.

FIG. 5 is a diagram illustrating an embodiment of a video data structure. In some embodiments, the data structure shown in FIG. 5 comprises a video data structure for storing data in a pairing database (e.g., pairing database 316 of FIG. 3). In the example shown, video data 500 comprises a video track comprising a set of frames of video data (e.g., video data frame 502). Video data frames can occur at a consistent rate (e.g., 12 frames per second, 24 frames per second, 30 frames per second, 48 frames per second, 60 frames per second, etc.) or at a variable rate (e.g., depending on the video data being stored). Each video frame of the video track is associated with a time frame of a time track (e.g., time frame 504). The time frame stores time data indicating the time that the frame was recorded. Frames of the video track are additionally associated with a location frame of a location track (e.g., location frame 506). The location frame stores location data indicating the location where the frame was recorded. In some embodiments, the number of frames of video data associated with location data is based at least in part on a vehicle speed. Video stored using the video data structure of FIG. 5 is retrievable based on an associated time data and an associated location data. In some embodiments, the video data structure of FIG. 5 is used for video data associated with a mobile video camera (e.g., a video camera mounted on a mobile video device comprising one of the following: a car, a truck, a trailer associated with a semi truck, a van, a bus, or a commercial vehicle).

In some embodiments, video data is compressed and time and location data is stored as metadata associated with the video data in an associated separate or concatenated data structure.

Figure 6:
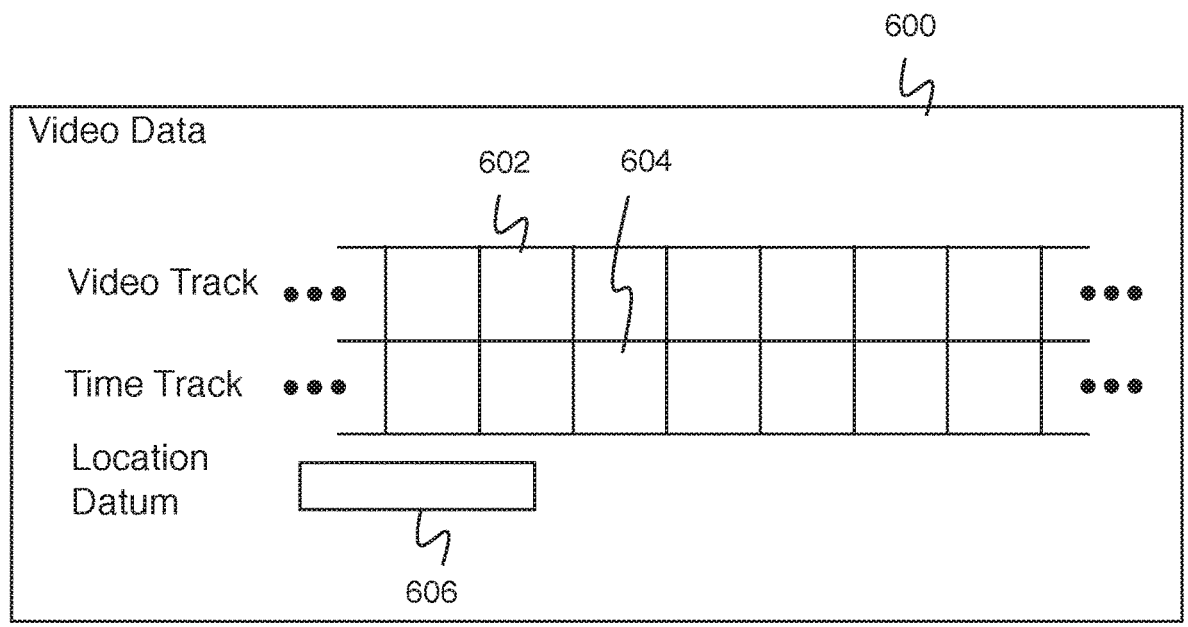
FIG. 6 is a diagram illustrating an embodiment of a video data structure.

FIG. 6 is a diagram illustrating an embodiment of a video data structure. In some embodiments, the data structure shown in FIG. 6 comprises a video data structure for storing data in a pairing database (e.g., pairing database 316 of FIG. 3). In the example shown, video data 600 comprises a video track comprising a set of frames of video data (e.g., video data frame 602). Video data frames can occur at a consistent rate (e.g., 12 frames per second, 24 frames per second, 30 frames per second, 48 frames per second, 60 frames per second, etc.) or at a variable rate (e.g., depending on the video data being stored). Each video frame of the video track is associated with a time frame of a time track (e.g., time frame 604). The time frame stores time data indicating the time that the frame was recorded. Video data 600 additionally comprises location datum 604. Location datum 604 stores a location indicating where all of video data 600 was recorded. Video stored using the video data structure of FIG. 6 is retrievable based on an associated time data and an associated location data. In some embodiments, the video data structure of FIG. 6 is used for video data associated with a fixed video camera (e.g., a video camera mounted on a static video device comprising one of the following: a lamp post, a street light, a street lamp, a building, a loading dock, a loading yard, a fleet yard, or a street sign).

Figure 7:
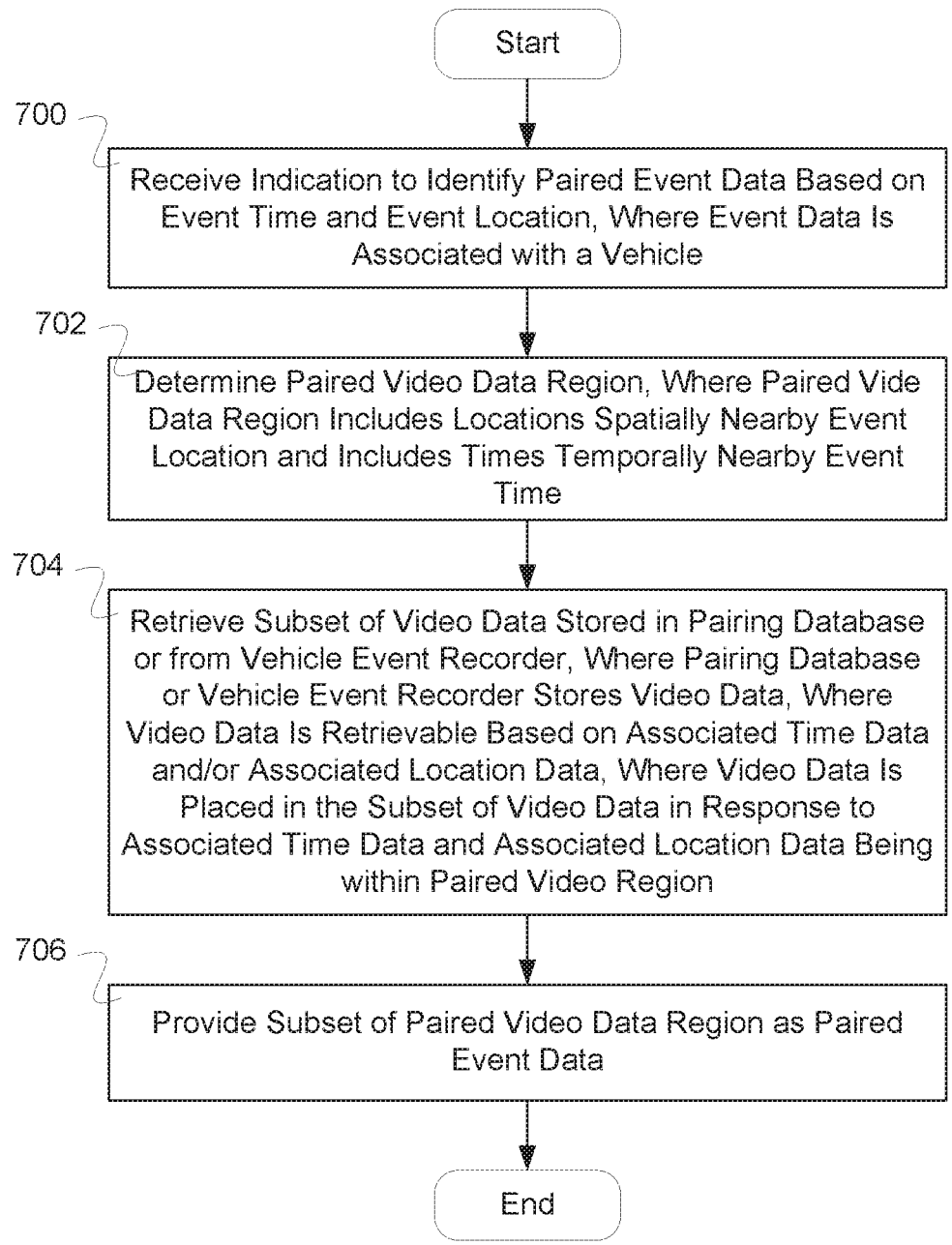
FIG. 7 is a flow diagram illustrating an embodiment of a process for dynamic pairing.

FIG. 7 is a flow diagram illustrating an embodiment of a process for dynamic pairing. In some embodiments, the process of FIG. 7 is executed by a vehicle data server (e.g., vehicle data server 104 of FIG. 1. In the example shown, in 700, an indication is received to identify paired event data based at least in part on an event time and an event location, wherein the event data is associated with a vehicle. For example, the indication is received from a vehicle event recorder, from a client system, from a vehicle data server process, etc. In various embodiments, an event comprises a loading event, an accident, a driving event, an operational safety event, a compliance event, a parking event, or any other appropriate event. In 702, a paired video data region is determined, wherein the paired video data region includes locations spatially nearby the event location and includes times temporally nearby the event time. In some embodiments, the video data is associated with a mobile video device comprising one of the following: a car, a truck, a trailer associated with a semi truck, a van, a bus, or a commercial vehicle. In 704, a subset of video data stored in a pairing database or from a vehicle event recorder is retrieved, wherein the pairing database or vehicle event recorder stores a video data, wherein the video data is retrievable based on an associated time data and/or an associated location data, and wherein the video data is placed in the subset of video data in response to the associated time data and the associated location data being within the paired video data region. For example, based on previously received location and time metadata associated with vehicle event recorders, it is determined which vehicle event recorders and/or databases store video within the selected event time and location windows. The determined stored video is retrieved from a database or from video recorder(s). The video is retrieved such that private client metadata/information is not retrieved or is subsequently scrubbed so that it cannot be revealed when provided for viewing. In 706, the subset of video data is provided as the paired event data.

Figure 8:
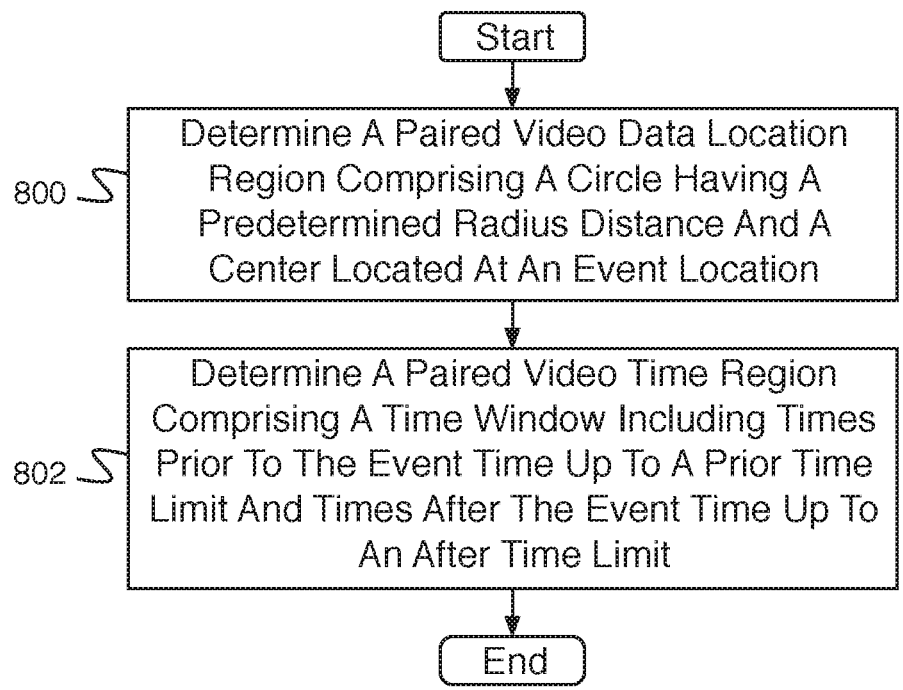
FIG. 8 is a flow diagram illustrating an embodiment of a process for determining a paired video data region.

FIG. 8 is a flow diagram illustrating an embodiment of a process for determining a paired video data region. In some embodiments, the process of FIG. 8 implements 702 of FIG. 7. In the example shown, in 800, a paired video data location region comprising a circle having a predetermined radius distance and a center located at an event location is determined. In some embodiments, the paired video data location region additionally comprises being within a direct line of sight of the event location (e.g., resulting in being within a portion of a circle). In 802, a paired video time region comprising a time window including times prior to the event time up to a prior time limit and times after the event time up to an after time limit is determined.

Figure 9:
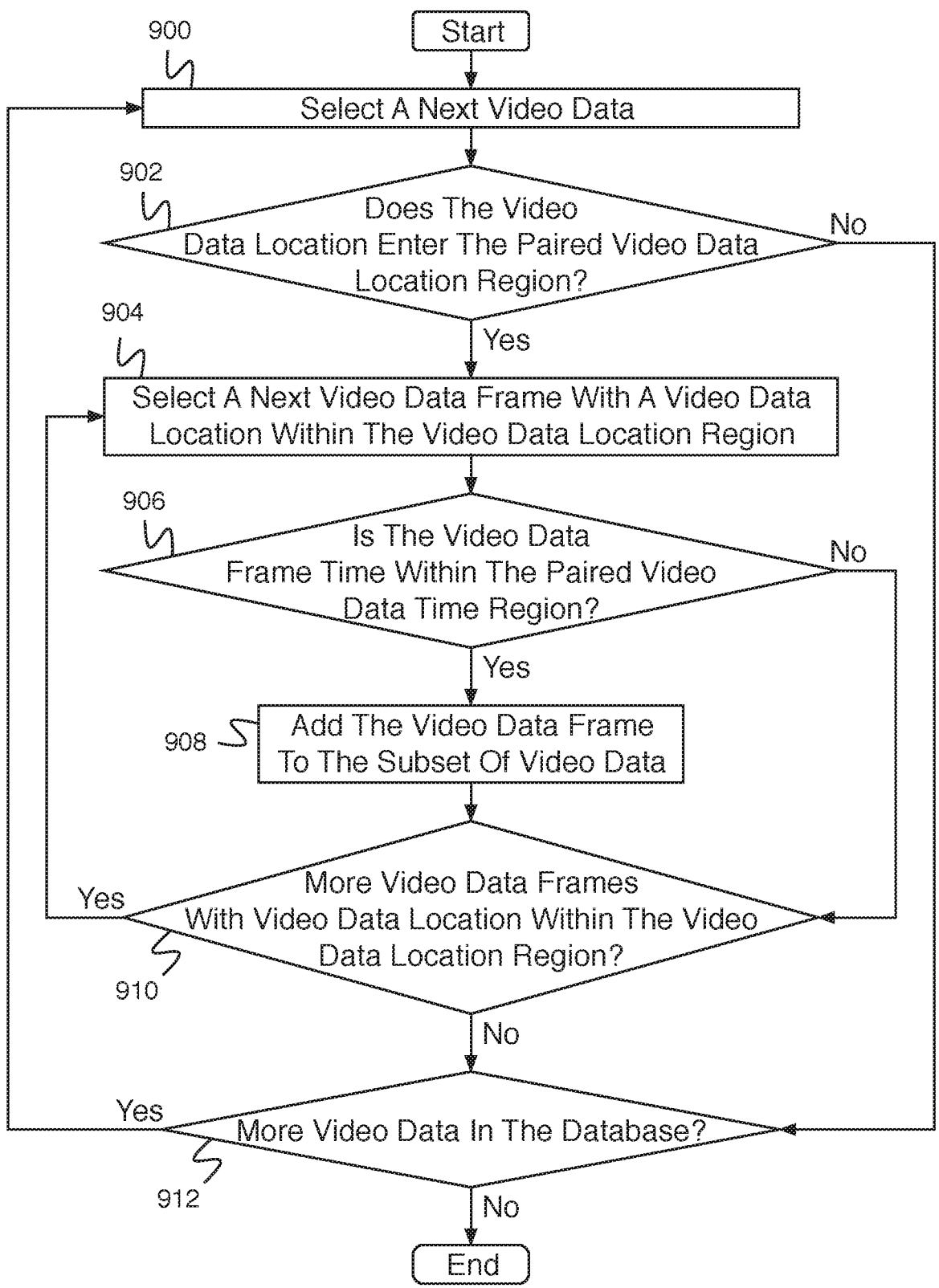
FIG. 9 is a flow diagram illustrating an embodiment of a process for determining a subset of a video stored in a pairing database and/or retrievable from one or more Vehicle Event Recorder.

FIG. 9 is a flow diagram illustrating an embodiment of a process for determining a subset of a video stored in a pairing database and/or retrievable from one or more Vehicle Event Recorder. In some embodiments, the process of FIG. 9 comprises a process for determining the subset of video stored in a pairing database of 704 of FIG. 7. In the example shown, in 900, a next video data is selected. For example, video is selected based on prior information regarding the locations and times that video was acquired. In some embodiments, each video data in the database comprises a video data recording received from a vehicle event recorder.

In some embodiments, each video data is associated with an identifier. In 902, it is determined whether the video data location enters the paired video data location region. In the event it is determined that the video data location does not enter the paired video data location region, control passes to 912. In the event it is determined that the video data location enters the paired video data location region, control passes to 904. In 904, a next video data frame with a video data location within the video data location region is selected. In 906, it is determined whether the video data frame time is within the paired video data time region. In the event it is determined that the video data time is not within the paired video data time region, control passes to 910. In the event it is determined that the video data time is within the paired video data time region, control passes to 908. In 908, the video data frame is added to the subset of video data. For example, a video data frame is retrieved from a paired video database or from a vehicle event recorder and added to a subset of video data to be stored as a grouping of video data that is associated with an event. In various embodiments, the video data is retrievable using a time indication associated directly with the video frame, using a location indication associated with the video frame or a vehicle location data/indication (e.g., a GPS location), or any other appropriate indicator. In 910, it is determined whether there are more video data frames with a video data location within the video data location region. In the event it is determined that there are more video data frames with a video data location within the video data location region, control passes to 904. In the event it is determined there are not more video data frames with a video data location within the video data location region, control passes to 912. In 912, it is determined whether there is more video data in the database. In the event it is determined that there is more video data in the database, control passes to 900. In the event it is determined that there is not more video data in the database, the process ends. In some embodiments, multiple subsets are determined (e.g., distinct subsets are determined for distinct video data, for distinct vehicles, for distinct cameras, for distinct organizations, etc.).

In some embodiments, the determination of video data within the time and location windows associated an event is not done frame by frame as in FIG. 1, but instead is done using metadata associated with previously recorded information that can easily be used to determine stored vehicle event recorder data or stored database data that is associated with the event.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamic pairing, comprising:
an interface configured to:
receive an indication to identify paired event data based at least in part on an event time and an event location, wherein the event data is associated with a vehicle; and
a processor configured to:
determine a paired video data region, wherein the paired video data region includes a paired video data location region including locations spatially nearby the event location and includes a paired video time region including times temporally nearby the event time, wherein the determining of the paired video data region comprises to:
determine the paired video data location region including a circle having a predetermined radius distance and a center located at the event location; and
determine the paired video time region including times prior to the event up to a prior time limit and times after the event up to an after prior time limit;
retrieve a subset of video data stored in a pairing database or from a vehicle event recorder, wherein the pairing database or the vehicle event recorder stores a video data, wherein the video data is retrievable based on an associated time data and/or an associated location data, wherein the video data includes a set of frames, wherein a video data frame of the set of frames is associated with a time frame of a time track, the time frame storing time data indicating a time that the video data frame was recorded, wherein a frame of the set of frames is associated with location data indicating where the frame was recorded wherein a number of frames of video data associated with the associated location data is based at least in part on a first vehicle speed or a second vehicle speed, and wherein the video data is placed in the subset of video data in response to the associated time data and the associated location data being within the paired video data region, wherein the retrieving of the subset of video data comprises to:
determine whether the data location of the video data enters the paired video data location region; and
in response to a determination that the data location of the video data enters the paired video data location region:
determine whether the time frame of the video data frame is within the paired video time region; and
in response to a determination that the time frame of the video data frame is within the paired video time region, add the video data to the subset of video data; and
provide the subset of the video data as the paired event data.

2. The system of claim 1, wherein the video data is associated with a video data identifier.

3. The system of claim 1, wherein spatially nearby further comprises being within a direct line of sight resulting in being within a portion of the circle.

4. The system of claim 1, wherein the subset of video data comprises one of a plurality of subsets of video data.

5. The system of claim 4, wherein each of the plurality of subsets is associated with a camera.

6. The system of claim 1, wherein the vehicle comprises one of the following: a car, a truck, a trailer associated with a semi truck, a van, a bus, or a commercial vehicle.

7. The system of claim 1, wherein the video data is associated with a mobile video device comprising one of the following: a car, a truck, a trailer associated with a semi truck, a van, a bus, or a commercial vehicle.

8. The system of claim 1, wherein the video data is associated with a static video device comprising one of the following: a lamp post, a street light, a street lamp, a building, a loading dock, a loading yard, a fleet yard, or a street sign.

9. The system of claim 1, wherein the event data comprises one of the following: a loading event, an accident, a driving event, an operational safety event, a compliance event, or a parking event.

10. The system of claim 1, wherein the paired event data is created by a video camera.

11. A method for dynamic pairing, comprising:
receiving an indication to identify paired event data based at least in part on an event time and an event location, wherein the event data is associated with a vehicle; and
determining, using a processor, a paired video data region, wherein the paired video data region includes a paired video data location region including locations spatially nearby the event location and includes a paired video time region including times temporally nearby the event time, wherein the determining of the paired video data region comprises:
  determining the paired video data location region including a circle having a predetermined radius distance and a center located at the event location; and
  determining the paired video time region including times prior to the event up to a prior time limit and times after the event up to an after prior time limit;
retrieving a subset of the paired video data stored in region from a pairing database or from a vehicle event recorder, wherein the pairing database or the vehicle event recorder stores a video data, wherein the video data is retrievable based on an associated time data and/or an associated location data, wherein the video data includes a set of frames, wherein a video data frame of the set of frames is associated with a time frame of a time track, the time frame storing time data indicating a time that the video data frame was recorded, wherein a frame of the set of frames is associated with location data indicating where the frame was recorded wherein a number of frames of video data associated with the associated location data is based at least in part on a first vehicle speed or a second vehicle speed, and wherein the video data is placed in the subset of video data in response to the associated time data and the associated location data being within the paired video data region, wherein the retrieving of the subset of video data comprises:
  determining whether the data location of the video data enters the paired video data location region; and
  in response to a determination that the data location of the video data enters the paired video data location region:
    determining whether the time frame of the video data frame is within the paired video time region; and
    in response to a determination that the time frame of the video data frame is within the paired video time region, adding the video data to the subset of video data; and
providing the subset of the paired video data region as the paired event data.

12. A computer program product for dynamic pairing, the computer program product being embodied in a non-transitory computer readable storage medium and comprising computer instructions for:
receiving an indication to identify paired event data based at least in part on an event time and an event location, wherein the event data is associated with a vehicle; and
determining, using a processor, a paired video data region, wherein the paired video data region includes a paired video data location region including locations spatially nearby the event location and includes a paired video time region including times temporally nearby the event time, wherein the determining of the paired video data region comprises:
  determining the paired video data location region including a circle having a predetermined radius distance and a center located at the event location; and
  determining the paired video time region including times prior to the event up to a prior time limit and times after the event up to an after prior time limit;
retrieving a subset of the paired video data stored in region from a pairing database or from a vehicle event recorder, wherein the pairing database or the vehicle event recorder stores a video data, wherein the video data is retrievable based on an associated time data and/or an associated location data, wherein the video data includes a set of frames, wherein a video data frame of the set of frames is associated with a time frame of a time track, the time frame storing time data indicating a time that the video data frame was recorded, wherein a frame of the set of frames is associated with location data indicating where the frame was recorded, wherein a number of frames of video data associated with the associated location data is based at least in part on a first vehicle speed or a second vehicle speed, and wherein the video data is placed in the subset of video data in response to the associated time data and the associated location data being within the paired video data region, wherein the retrieving of the subset of video data comprises:
  determining whether the data location of the video data enters the paired video data location region; and
  in response to a determination that the data location of the video data enters the paired video data location region:
    determining whether the time frame of the video data frame is within the paired video time region; and
    in response to a determination that the time frame of the video data frame is within the paired video time region, adding the video data to the subset of video data; and
providing the subset of the paired video data region as the paired event data.

* * * * *

UNITED STATES PATENT AND TRADEMARK OFFICE
CERTIFICATE OF CORRECTION

| | | |
|---|---|---|
| PATENT NO. | : 10,847,187 B1 | Page 1 of 1 |
| APPLICATION NO. | : 15/988672 | |
| DATED | : November 24, 2020 | |
| INVENTOR(S) | : Brett Hoye and Anton Lunde | |

It is certified that error appears in the above-identified patent and that said Letters Patent is hereby corrected as shown below:

In the Specification

In Column 5, Line(s) 26, delete "paried" and insert --paired--, therefor.
In Column 6, Line(s) 15, delete "paried" and insert --paired--, therefor.

In the Claims

In Column 10, Line(s) 24, Claim 1, after "recorded", insert --,--.
In Column 11, Line(s) 37, Claim 11, after "recorded", insert --,--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*